United States Patent [19]

Parker

[11] Patent Number: 4,674,759
[45] Date of Patent: Jun. 23, 1987

[54] TRASH CONTAINER WHEEL STRUCTURE

[76] Inventor: Bruce H. Parker, 25543 Avenida Frasca, Valencia, Calif. 91355

[21] Appl. No.: 736,640

[22] Filed: May 21, 1985

[51] Int. Cl.⁴ .............................................. B62B 1/10
[52] U.S. Cl. ................................ 280/47.26; 220/1 T; 301/63 PW; 301/106; 301/122; 384/416; 384/420
[58] Field of Search ................ 280/47.26, 47.24, 79.2, 280/79.1 R; 220/1 T; 301/63 PW, 111, 106, 122; 152/323, 327; 384/416, 420; 425/425; 264/126, 310, 311, 271.1, 275

[56] References Cited

U.S. PATENT DOCUMENTS

| | | | |
|---|---|---|---|
| 2,863,701 | 12/1958 | Jones et al. | 301/122 |
| 2,940,781 | 6/1960 | Erikson | 301/63 PW |
| 4,269,460 | 5/1981 | Orain | 384/416 |
| 4,344,655 | 8/1982 | Pellegrino | 301/63 PW |
| 4,450,976 | 5/1984 | Snyder et al. | 220/1 T |
| 4,508,675 | 4/1985 | Salatiello et al. | 264/310 |

Primary Examiner—John J. Love
Assistant Examiner—Eric D. Culbreth
Attorney, Agent, or Firm—Louis J. Bachand

[57] ABSTRACT

Wheel structure for a trash container comprising an enhanced thickness hub portion defined by positioning a metal member within the locus of the wheel wall during molding so as to increase wall thickness by better heat transfer and increase resin buildup in the vicinity of the metal member. The metal member is usefully a fastener for the end of the wheel carrying axle whereby the position of the wheel on the axle is fixed by the fastening metal member being trapped in the increased wall thickness hub.

22 Claims, 5 Drawing Figures

TRASH CONTAINER WHEEL STRUCTURE

TECHNICAL FIELD

This invention has to do with improved wheel structures for various utilities, particularly trash containers of the type used by municipalities for refuse collection. Such containers are typically in excess of 30-60 gallons in capacity, and commonly 90 gallons or more up to 300 gallons. As such the containers are not liftable by the householder, and indeed are intended for automated loading by municpal trucks. Being high capacity containers they can be quite heavy when filled. The industry has supplied such containerss with corner positioned wheels or rollers to facilitate transport to the curb for pick-up.

BACKGROUND OF THE INVENTION

Typical wheel mounting has been by means of a central axle which is supported adjacent the wheel or roller by bosses defined by the container. Since the trash container wheels with which the invention is concerned are molded of plastic, the sturdy support of the axle in the wheel is dependent on the hub structure which is strong enough to support the weight of the loaded container, sidewall structure sufficient to the compression loading it encounters and a peripheral wall tread able to ride over the ground easily and without collapse. In practice, the wheels are typically rotationally molded for ease of forming a strain-free hollow body, with the hub defined by a separable insert within the mold.

SUMMARY OF THE INVENTION

The strength needed throughout the wheel is obtained by molding to a suitable wall thickness with a structurally sufficient plastic such as crosslinked polyethylene. There are some places in the wheel however that require added thicknesses of plastic material if they are to have adequate strength. Such a place is the hub area. Because the sophisticated resins used to mold trash containers are costly, there is a need to minimize overall resin consumption while still getting increased thickness in the hub area. It is an object of this invention to provide method and means for selectively building up wall thickness in critical places about the hub while not unnecessarily increasing wall thickness elsewhere. It is a further object to improve the heat transfer in selected areas in the mold to enhance the deposition of resin there and achieve relative wall thickness buildup selectively thereabout. It is another object to use a metal member suspended within the mold in the region of outboard hub formation to enhance heat transfer, increase resin buildup and achieve relatively thicker walls in the hub region selectively. It is a further object to utilize the metal member as a terminus for the axle bore, and fastening the axle to the wheel hub so as to prevent shifting of the wheel relative to the axle. It is a still further object to minimize assembly problems and lost parts by incorporating the axle cap in the molded wheel as the metal member adapted to receive the axle end in molded in condition. Yet another object is to provide bearing means for the metal member engaged with the axle.

These and other objects of the invention to become apparent hereinafter are realized by the provision of a trash container wheel structure comprising an interiorly hollow plastic wheel having integrally molded a peripheral wall for ground contact, and a pair of circular side walls radially supporting the wheel periphery and centrally defining an axially extended hub means, the hub means being partly defined by a hub wall portion of relatively enlarged wall thickness in one of the side walls, the portion being annular, sized to receive a wheel carrying axle and formed about a metal member suspended within the wall portion beyond the wheel shaping mold wall during molding, the metal member remaining trapped within the hub wall portion.

In this and like embodiments, the plastic wheel is molded of synthetic organic resin, such as polyethylene; there is also included inwardly continued tubular extents centrally of the side walls, the extents defining an axle receiving bore, the hub wall portion defining a terminus of the bore; the metal member is generally circular, the hub wall portion being generally coextensive with the radius of the member; the metal member defines an axle shaft receiving bore, and there is also included means to fasten the metal member to the axle shaft against shifting of the axle shaft relative to the hub wall portion in use of the container; and, bearing means also are provided with the hub wall portion, the bearing means facilitating rotation of the metal member within the hub wall portion responsive to turning of the axle shaft with the metal member fastened thereto.

In particular embodiments, the invention provides in combination: at least one trash container wheel structure as described, and an axle assembly adapted to carry the trash container on the wheel structure; or, a trash container of over 30-60 gallons capacity having an axle structure including an axle and an axle support, and a pair of wheels having the structure described. In either case there may further be included bearing means within the hub wall portion, the bearing means facilitating rotation of the metal member within the hub wall portion responsive to turning of the axle shaft with the metal member fastened thereto.

In a particularly preferred embodiment, the invention provides trash container wheel structure comprising an integrally rotationally molded, interiorly hollow wheel having a peripheral wall for ground contact, hub means coaxial with the peripheral wall, and spaced inboard and outboard circular side walls between the hub means and the peripheral wall, the hub means comprising opposed axially continued extents of the side walls and an axle-receiving metal member suspended in the outboard one of the side walls in rotationally molded wall thickness enhancing relation, whereby the outboard wall defines a hub wall portion of relatively enlarged wall thickness.

In this and like preferred embodiments, the metal member remains trapped in the outboard side wall, and engages the wheel axle in wheel-axle shift blocking relation; the plastic wheel is molded of synthetic organic resin, e.g. a synthetic organic resin such as crosslinked polyethylene; there are inwardly continued tubular extents inwardly of the inboard and outboard side walls, the extents defining an axle receiving bore, the outboard side wall hub wall portion defining a terminus of the bore; the metal member is generally cup-shaped with a generally circular flange, the hub wall portion being generally coextensive with the member flange; the metal member defines an axle fastening means within its cup-shaped extent to fasten the metal member to the axle shaft against shifting of the axle shaft relative to the hub wall.portion in use of the container; there is also bearing means within the hub wall portion, the bearing means facilitating rotation of the metal member within the hub wall portion responsive to turning of the axle shaft with the metal member fastened thereto; the bearing structure comprising annular discs coaxial with the bore, the discs being supported by the hub wall portion and slidably engaged with the inner and outer surfaces of the metal member, or the bearing structure comprises a low friction foil such as aluminum foil conformed about the metal member edge to define therewith a bearing.

As in earlier embodiments, the invention contemplates in combination: at least one trash container wheel structure as described, and an axle assembly adapted to carry the trash container on the wheel structure; and a trash container of over 30–60 gallons capacity having an axle structure including an axle and an axle support, and a pair of wheels having the structure as described.

In a highly particularly preferred embodiment, the invention provides a trash container wheel structure comprising an integrally molded, cross-linked polyethylene, interiorly hollow wheel having a peripheral wall for ground contact, hub means coaxial with the peripheral wall, and spaced inboard and outboard circular side walls between the hub means and the peripheral wall, the hub means comprising opposed axially continued extents of the side walls defining an axle receiving bore, and an axle-receiving metal member suspended in the outboard of one of the side walls in molded wall thickness enhancing relation, the metal member being generally cup-shaped with a generally circular flange, whereby the outboard wall defines a hub wall portion of relatively enlarged wall thickness generally coextensive with the member flange and terminating the bore, the metal member remaining trapped in the outboard side wall, and defining an axle fastening means within its cup shaped extent to engage with the wheel axle in wheel-axle shift blocking relation relative to the hub wall portion in use of the container, bearing means within the hub wall portion, the bearing means facilitating rotation of the metal member within the hub wall portion responsive to turning of the axle shaft with the metal member fastened thereto, the bearing structure comprising an annular bearing element between the metal member and the hub wall portion coaxial with the bore, the bearing element being supported by the hub wall portion and slidably engaged with the inner and outer surfaces of the metal member.

Method is further contemplated, including the method of fabricating a trash container wheel by the rotational molding process to have a relatively thicker wheel hub, which includes improving the heat transfer in the vicinity of the wheel hub during molding by suspending a metal member within the rotational mold in registration with the wheel hub locus.

THE DRAWINGS

The invention will be further described as to an illustrative embodiment in conjunction with the attached drawing in which.

PREFERRED MODES

Figure 1:
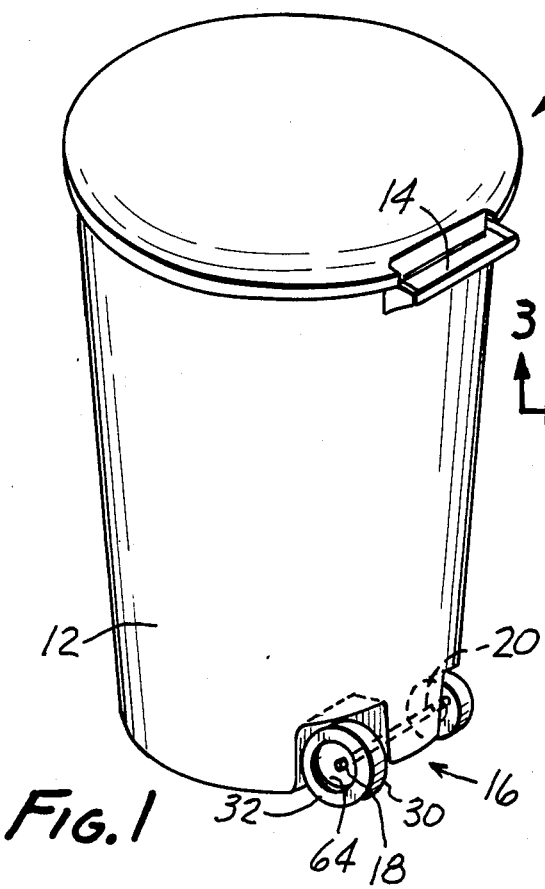
FIG. 1 is a perspective view of a trash container utilizing the present wheel invention.

With reference now to the drawing in detail, a trash container 10 is shown in FIG. 1 of the type suitably used for municipal automated trash collection, having a generally cylindrical, slightly upwardly outwardly tapered wall 12, a bottom wall (not shown), a handle 14 and a rolling arrangement 16 vertically below the handle. In use the container is tipped by the handle and rolled on the rolling arrangement 16.

The trash container 10 rolling arrangement 16 is shown in typical form to include an axle 18 passing through and journaled in boss 20 integrally formed with the container wall 12. Wheel structures 30 according to the invention are mounted on the axle 18 as described hereinafter.

Figure 2:
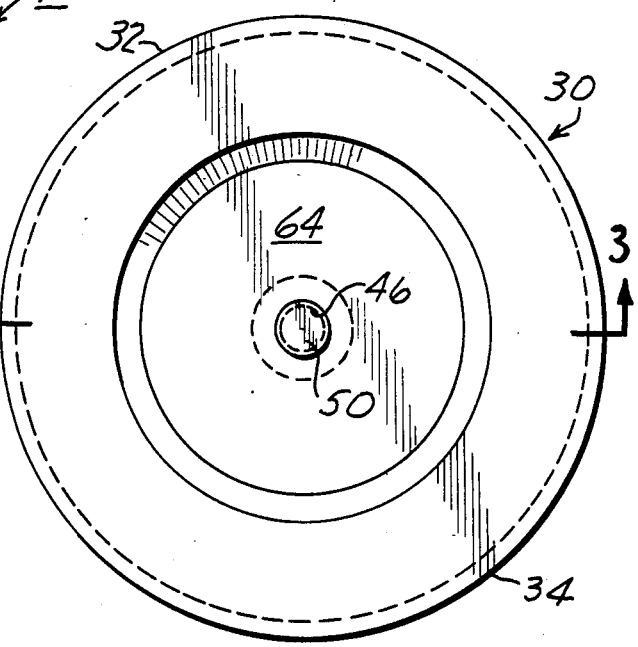
FIG. 2 is a side elevational view of the wheel of the invention.
Figure 3:
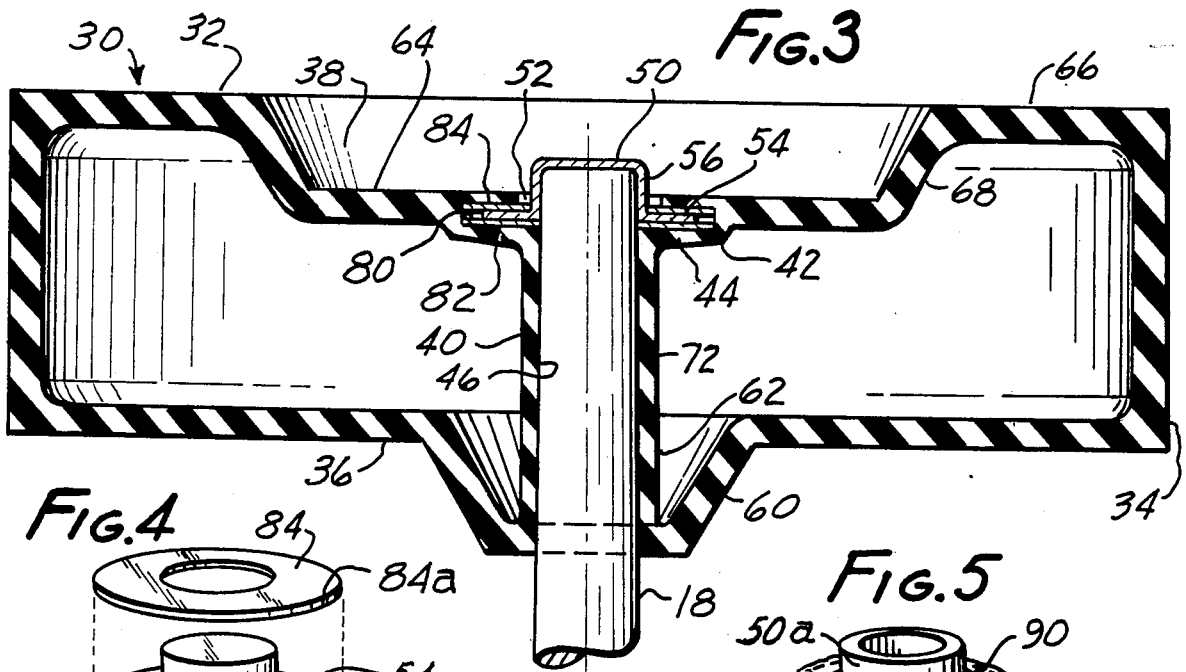
FIG. 3 is a transverse sectional view of the wheel taken on line 3—3 in FIG. 2; and, FIG. 4 is an exploded view of the bearing arrangement.

With reference now to FIGS. 2 and 3, the wheel structure 30 comprises an interiorly hollow plastic wheel 32 having integrally molded, suitably by rotational or blow-molding, a peripheral wall 34 for ground contact, and a pair of inboard and outboard circular side walls 36, 38 radially supporting the wheel periphery and centrally defining an axially extended hub means 40. The hub means 40 is partly defined by a hub wall portion 42, a section of the outboard wall 38 having relatively enlarged wall thickness, i.e. at 44 to form the hub wall portion. The hub wall portion 42 is annular in cross-section and defines a bore 46 sized to receive the wheel carrying axle 18. The hub wall portion 42 is formed about a metal member 50 suspended on a rod within the wall portion beyond the wheel shaping mold wall during molding (not shown). The metal member 50 thereby remains trapped or embedded within the hub wall portion 42.

It has been found that the mentioned better heat transfer characteristics are realized at the locus of hub wall portion 42 formation during molding by interposition of the metal member 50 as described, whereby the thin wall of the metal member conducts molding wall heat interiorly of the molding cavity, the conducted heat enabling increased resin build up, i.e. at 44, and thus increased strength in this critical portion of the wheel, without unnecessarily increasing the wall thickness throughout the wheel 32, so that strength is obtained where most needed and expensive molding resin is not wasted where not needed.

It is desirable, since the metal member 50 will remain in the molded wheel 32 to make the member perform still further functions. Since the member 50 is preferably circular so as to uniformly enhance the wall thickness circularly about the axle passing bore 46, use of a circular member is advantageous.

It has been found in a further aspect of the present invention that the metal member 50 is advantageously formed as a nut or cap for the axle 18. If the member 50 is configured as a pal nut for example, the member can be fastened to the end of the axle 18 by hammering the axle into the nut in its trapped condition within the molded wheel hub portion 42. Because trash containers are frequently assembled by municipal workers far from the container factory, the use of embedded parts such a pal nut configured metal members 50 will result in fewer parts to keep track of, and reduce losses and call backs for additional parts, particularly expensive parts such as pal nuts. In addition, assembly is quicker because the pal nut can be easily oriented by simply holding the wheel 32, which is far easier than trying to hold the pal nut in proper position for receiving the end of axle 18.

Figure 4:
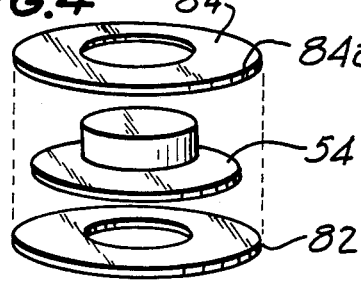

The preferred arrangement for the metal member 50 is shown in FIGS. 2-4. The wheel 32 is of course cylindrical overall and has of generally uniform with a peripheral wall 34 which defines the tread area of the wheel, and circular side walls, namely inboard wall 36 which is closer to the trash container 10, and outboard wall 38 which is farther from the container. The inboard wall 36 is generally planar with an axial, conical boss 60 formed outwardly thereof. The boss 60 has a cylindrical wall 62 axially thereof which is a continued extent of the inboard wall 36 and defines together with the coaxial, like continued extent 72 of the outboard wall 38 with which it merges in molding of the wheel and axle 18 journaling bore 46 in the wheel 32. The outboard wall 38 is dished at 64 from a generally planar flange 66, to form a circular rib 68, the hub portion 42 being formed centrally of the rib 68 of the outboard wall, as shown.

With particular attention to the hub wall portion 42, it is seen that the member 50 is cup-shaped and disposed normal to the axle 18 and coaxial therewith, and spaced by a gap 52 from the surrounding molded wall 38. The circular flange 54 of the member 50 surrounds the cup portion 56, and defines the member axial face, the cup portion being sized to recieve the end of the axle 18 as shown. The member cup portion 56 is suitably crimped or provided with teeth (not shown) to grip the axle 18 against relative movement with the member. In this manner, the relationship of the wheel 32 to the axle 18 can be stabilized. In previously available trash containers the pal nut was fastened to the axle end but the nut was not fixed at the wheel but was free more or less outboard of it. The result was possible instability of the trash container since the spacing of the wheels could vary independently on both sides of the container, and the loads on the wheels were different depending on the closer or farther spacing of the wheels to the container. Moreover, the inward positioning of the wheel left a hazardous projection of the axle beyond the wheel. Alternate forms of the pal nut metal member 50 may be used such as the open-ended axle lock nut 50a shown in FIG. 5.

The wall thickness at 44 has been found to minimize cracking problems in the wheels caused by insufficient material at the hub wall portion 42. In general, increases in wall thickness to between 120 and 170% of the wall thickness obtained without interposition of the metal member 50 are preferred and in slope-shouldered form as shown.

Because the metal member 50 is embedded in or trapped within the cavity 80 it defines in the hub wall portion 42, it is preferred to provide a bearing means to facilitate rotation of the member within the cavity in response to turning of the wheel 32 and/or axle 18. For this purpose, it has been found advantageous to to incorporate bearing elements between the member 50 and the surrounding walls of the cavity 80. One form of such bearing is shown in FIG. 3 and particularly in FIG. 4 comprising a pair of washers 82, 84 on either side of the member 50 to provide a metal to metal contact for the member 50. The material of the bearings 82, 84 is usually metal such as steel, but the material is not narrowly critical other than to have greater lubricity than the surrounding cavity and to be resistant to warping or other deteriorations during in situ molding operations.

The outer of the washers, washer 84, is dished to overlie the edge of flange 54 circumscribing the cup portion 56, while the inner washer 82 abuts the washer axial lip 84a and engages the opposite side of flange 54 of the member 50.

Figure 5:
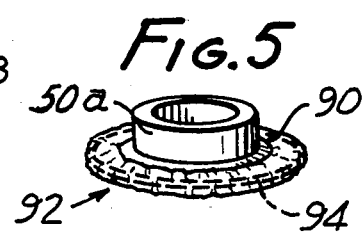
FIG. 5 is a perspective view of an alternate bearing arrangement.

Another form of bearing is shown in FIG. 5. There aluminum foil 90 is conformed to the edge 92 of the metal member 50, covering the edge margin 94 of the member as well. After molding with the foil 90 thus in place the metal member 50a turns freely on the foil bearing surface.

The wheels 32 are assembled with the axle 18 onto the container 10. Once the axle 18 is fastened to the member 50 on either side of the wheel structure 16, it will not shift relative to the hub wall portion 42 or the container 10 itself, producing an improved stability in use, and increased longevity for the wheel through stronger hubs, whereby the foregoing objects of the invention are realized. It will be evident that the wheel structure described herein has utility beyond trash containers and may advantageously be used on all types of wheeled containers, toys, dollies, wheeled vehicles and implements and the like, wherever ease of assembly, permanence of positioning and minimum skill needs are paramount.

I claim:

1. Wheel structure comprising an interiorly hollow plastic wheel having integrally molded a peripheral wall for ground contact, a pair of circular side walls radially supporting the wheel periphery and centrally defining an axially extended hub means, said hub means being partly defined by a hub wall portion of relatively enlarged wall thickness in one of said side walls, said hub wall portion being annular, sized to receive a wheel carrying axle, a metal member having an axial face normal to said axle, said metal member being embedded within said wall portion, and a bearing element supported by said hub wall portion and slidably engaged with said metal member axial face.

2. Wheel structure according to claim 1, in which said plastic wheel is molded of synthetic organic resin.

3. Wheel structure according to claim 2, in which said synthetic organic resin is polyethylene.

4. Wheel structure according to claim 1, including also inwardly continued tubular extents centrally of said side walls, said extents defining an axle receiving bore, said hub wall portion defining a terminus of said bore.

5. Wheel structure according to claim 1, in which said metal member is generally circular, said hub wall portion being generally coextensive with the radius of said member.

6. Wheel structure according to claim 1, in which said metal member is fastened to said axle shaft against shifting of said axle shaft relative to said hub wall portion.

7. In combination: at least one wheel structure according to claim 1, and an axle assembly adapted to carry said trash container on said wheel structure.

8. In combination: a trash container of over 30 gallons capacity having an axle structure including an axle and an axle support, and a pair of wheels having the structure of claim 1.

9. In combination: a trash container of over 30 gallons capacity having an axle structure including an axle and an axle support, and a pair of wheels having the structure of claim 6.

10. Wheel structure comprising an integrally molded, interiorly hollow wheel having a peripheral wall for ground contact, hub means coaxial with said peripheral wall, and spaced inboard and outboard circular side walls between said hub means and said peripheral wall, said hub means comprising opposed axially continued extents of said side walls, an axle-receiving metal member having an axial face and embedded in the outboard one of said side walls in molded wall thickness enhancing relation, whereby said outboard wall defines a hub wall portion of relatively enlarged wall thickness, and a bearing element slidably engaged with said metal member axial face in bearing stucture defining relation.

11. Wheel structure according to claim 10, in which said metal member is embedded in said outboard side wall, and engages the wheel axle in wheel-axle shift blocking relationship.

12. Wheel structure according to claim 11, in which said plastic wheel is molded of synthetic organic resin.

13. Wheel structure according to claim 12, in which said synthetic organic resin is cross-linked polyethylene.

14. Wheel structure according to claim 12, including also inwardly continued tubular extents inwardly of said inboard and outboard side walls, said extents defining an axle receiving bore, said outboard side wall hub wall portion defining a terminus of said bore.

15. Wheel structure according to claim 14, in which said metal member is generally cup-shaped with a generally circular flange defining said axial face, said hub wall portion being generally coextensive with said member flange.

16. Wheel structure according to claim 15, in which said metal member is fastened to said axle shaft and prevents shifting of said axle shaft relative to said hub wall portion in use of the container.

17. Wheel structure according to claim 10, in which said bearing structure comprises an annular disc coaxial with said bore supported by said hub wall portion and slidably engaged with said axial face of said metal member.

18. Wheel structure according to claim 17, in which said bearing structure comprises a low friction foil conformed about the metal member edge to define therewith a bearing.

19. In combination: at least one wheel structure according to claim 17 or 18, and an axle assembly adapted to carry a trash container on said wheel structure.

20. In combination: a trash container of over 30 gallons capacity having an axle structure including an axle and an axle support, and a pair of wheels having the structure of claim 17 or 18.

21. In combination: a trash container of over 30 gallons capacity having an axle structure including an axle and an axle support, and a pair of wheels having the structure of claim 10.

22. Wheel structure comprising an integrally rotationally molded, cross-linked polyethylene, interiorly hollow wheel having a peripheral wall for ground contact, hub means coaxial with said peripheral wall, and spaced inboard and outboard circular side walls between said hub means and said peripheral wall, said hub means comprising opposed axially continued extents of said side walls defining an axle receiving bore, and an axle-receiving metal member suspended in the outboard of one of said side walls in rotationally molded wall thickness enhancing relation, said metal member being generally cup-shaped with a generally circular flange defining an axial face on said metal member, whereby said outboard wall defines a hub wall portion of relatively enlarged wall thickness generally coextensive with said member flange and terminates said bore, said metal member being deflectable into engagement with the wheel axle in wheel-axle shifting blocking relation relative to said hub wall portion, and a bearing structure facilitating rotation of said metal member relative said hub wall portion responsive to turning of said axle with said metal member engaged therewith, said bearing structure comprising a bearing element coaxial with said bore, said bearing element being supported by said hub wall portion and slidably engaged with said metal member axial face.

* * * * *